(12) United States Patent
Li et al.

(10) Patent No.: US 12,100,866 B2
(45) Date of Patent: Sep. 24, 2024

(54) BATTERY CELL, BATTERY, ELECTRICAL APPARATUS, METHOD AND DEVICE FOR MANUFACTURING BATTERY CELL

(71) Applicant: CONTEMPORARY AMPEREX TECHNOLOGY CO., LIMITED, Ningde (CN)

(72) Inventors: Meng Li, Ningde (CN); Zhen Li, Ningde (CN); Zhixin Luo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/625,105

(22) Filed: Apr. 2, 2024

(65) Prior Publication Data

US 2024/0274999 A1 Aug. 15, 2024

Related U.S. Application Data

(63) Continuation of application No. PCT/CN2023/073824, filed on Jan. 30, 2023.

(30) Foreign Application Priority Data

Feb. 18, 2022 (CN) .......................... 202210148721.1

(51) Int. Cl.
*H01M 50/581* (2021.01)
*H01M 10/04* (2006.01)
*H01M 50/536* (2021.01)

(52) U.S. Cl.
CPC ..... *H01M 50/581* (2021.01); *H01M 10/0404* (2013.01); *H01M 50/536* (2021.01); *H01M 2200/10* (2013.01)

(58) Field of Classification Search
CPC ............. H01M 50/581; H01M 50/536; H01M 10/0404; H01M 2200/10
See application file for complete search history.

(56) References Cited

U.S. PATENT DOCUMENTS

| 5,188,909 A | 2/1993 | Pedicini | |
|---|---|---|---|
| 2011/0151285 A1* | 6/2011 | Hong | H01M 50/213 29/878 |

(Continued)

FOREIGN PATENT DOCUMENTS

| CN | 104882584 A | * | 9/2015 |
|---|---|---|---|
| CN | 111602278 A | | 8/2020 |

(Continued)

OTHER PUBLICATIONS

International Search Report for PCT application No. PCT/CN2023/073824, dated Apr. 18, 2023.

(Continued)

*Primary Examiner* — Matthew T Martin
*Assistant Examiner* — Adam J Francis
(74) *Attorney, Agent, or Firm* — Ladas & Parry LLP

(57) ABSTRACT

Provided are a battery cell, a battery, an electrical apparatus, and a method and device for manufacturing a battery cell. The battery cell includes a case, an end cover, an electrode assembly and a solder, the case has an accommodating cavity and an opening at one end; the end cover is connected to the case; the electrode assembly is provided in the accommodating cavity, the electrode assembly has a first tab, and the first tab faces the opening; the solder is provided between the end cover and the first tab and connects the end cover and the first tab; an insulating member is also provided between the end cover and the first tab, an insulating cavity (Continued)

is provided on the insulating member, a feed port is provided on one side of the insulating cavity, and the feed port faces the solder.

12 Claims, 6 Drawing Sheets

(56) References Cited

U.S. PATENT DOCUMENTS

| | | | |
|---|---|---|---|
| 2011/0151297 A1* | 6/2011 | Shimizu | H01M 50/597 |
| | | | 429/94 |
| 2012/0171556 A1* | 7/2012 | Kim | H01M 50/536 |
| | | | 429/174 |
| 2021/0050571 A1 | 2/2021 | Chun | |

FOREIGN PATENT DOCUMENTS

| | | | |
|---|---|---|---|
| CN | 113991260 A * | 1/2022 | |
| CN | 114204223 A | 3/2022 | |
| JP | 2003308824 A | 10/2003 | |
| JP | 2010258003 A | 11/2010 | |
| JP | 2014022284 A * | 2/2014 | |
| WO | 2020151473 A1 | 7/2020 | |

OTHER PUBLICATIONS

Written Opinion of International Searching Authority for PCT application No. PCT/CN2023/073824, dated Apr. 18, 2023.
Notification to Grant Patent Right for CN application No. 202210148721.1, dated Mar. 25, 2022.

* cited by examiner

BATTERY CELL, BATTERY, ELECTRICAL APPARATUS, METHOD AND DEVICE FOR MANUFACTURING BATTERY CELL

CROSS-REFERENCE TO RELATED APPLICATIONS

The present application is a continuation of International Patent Application No. PCT/CN2023/073824, filed on Jan. 30, 2023, which claims priority to China Patent Application No. 202210148721.1, filed on Feb. 18, 2022. The aforementioned patent applications are incorporated herein by reference in their entirety.

TECHNICAL FIELD

The present application relates to the technical field of batteries, and more particularly, to a battery cell, a battery, an electrical apparatus, and a method and device for manufacturing a battery cell.

BACKGROUND

With the development of science and technology and the enhancement of people's awareness of environmental protection, electric energy is gradually applied to more and more fields, such as new-energy vehicles, smart homes, electronic wearable devices, etc. As the core power component of these devices, batteries play a key role during use of these devices.

The basic unit that makes up a battery is a battery cell. The battery cell includes a shell and an electrode assembly. The tabs of the electrode assembly are welded to specific parts of the shell to transmit electrical energy to the outside of the battery cell.

However, during the welding process of the tabs and the shell, the electrode assembly or the shell is often damaged, causing problems such as short circuit or leakage of the battery cells, which affects the normal use of the battery cell and reduces the yield of the battery cell.

SUMMARY

The present application aims to solve at least one of the technical problems existing in the prior art. To this end, one purpose of the present application is to propose a battery cell that can reduce the damage to the battery cell during the welding process of the battery cell and improve the yield of the battery cell.

The present application further proposes a battery having the above-mentioned battery cell.

The present application further proposes an electrical apparatus having the above-mentioned battery.

The present application further proposes a method for manufacturing a battery cell.

The present application further proposes a device for manufacturing a battery cell.

The battery cell according to the present application includes: a case having an accommodating cavity and an opening at one end; an end cover connected to the case and used to close the opening; an electrode assembly provided in the accommodating cavity, the electrode assembly having a first tab facing the opening; a solder provided between the end cover and the first tab and connecting the end cover and the first tab, the melting point of the solder being lower than that of the end cover and the first tab; and an insulating member provided between the end cover and the first tab, an insulating cavity being provided on the insulating member, a feed port being provided on one side of the insulating cavity, and the feed port facing the solder; and when the temperature of the battery cell reaches the melting point of the solder, at least part of the solder is melted and enters the insulating cavity, so as to reduce the current between the end cover and the first tab or form an open circuit between the end cover and the first tab.

The solder of the battery cell according to the present application is connected to the end cover and the first tab through a process of melting and re-solidification. Since the melting point of the solder is lower than that of the end cover and the first tab, by controlling the heating temperature to be higher than the melting point of the solder and lower than the melting point of the end cover and the first tab in the welding process, the solder is melted while the end cover and the first tab are not melted, and the molten solder contacts with the end cover and the first tab and is connected with the end cover and the first tab respectively during solidification. The above structure ensures that the solder is connected to the end cover and the first tab while avoiding damage to the end cover and the first tab during the welding process, which improves the quality of the battery cell and enhances the yield of the battery cell. When the battery cell is in use, the first tab and the end cover are electrically connected by the solder. When the battery cell generates heat due to abnormal use and the temperature is higher than the melting point of the solder, the solder is melted, and the molten solder at least partially flows into the insulating cavity from the feed port, so that the first tab and the end cover are electrically connected through a small amount of solder, the current flowing through the battery cell is reduced, the electrochemical reaction of the battery cell is weakened, and the heat generation is reduced; or, there is no solder to electrically connect the first tab and the end cover, thereby forming an open circuit between the first tab and the end cover, the electrochemical reaction of the battery cell stops, and the heat generation stops. By reducing or stopping the heat generation of the battery cell which generates heat abnormally, the temperature and pressure of the battery cell are prevented from rising continuously to cause thermal runaway, and the use safety of the battery cell is improved.

The battery cell according to the present application includes the battery cell of any above embodiment.

The battery according to the present application is provided with the battery cell of the above embodiment. Since the battery of the present application is provided with the battery cell of the above embodiment, the battery has high quality and a longer service life.

The electrical apparatus according to the present application includes the battery of the above embodiment.

The electrical apparatus according to the present application is provided with the battery of the above embodiment, and the battery provides electric energy for the electrical apparatus. Since the electrical apparatus of the present application is provided with the battery of the above embodiment, the operation of the electric provided is more stable, the reliability is higher, and the service life is longer.

The method for manufacturing a battery cell according to the present application includes: providing a case having an accommodating cavity and an opening at one end; providing an end cover and a solder, the solder being connected to one side of the end cover, and the melting point of the solder being lower than that of the end cover; providing an electrode assembly having a first tab, the melting point of the first tab being higher than that of the solder; providing an insulating member, an insulating cavity being provided on the insulating member, and a feed port being provided on one side of the insulating cavity; installing the electrode assembly in the accommodating cavity, and causing the first tab to face the opening; disposing the insulating member between the end cover and the first tab, and connecting the end cover to the case to close the opening, the solder being located between the end cover and the first tab, and the feed port facing the solder; and heating the solder to melt the solder so as to connect the end cover and the first tab.

In the method for manufacturing a battery cell according to the present application, when the solder is heated, the solder can be melted and connect the end cover and the first tab together. At the same time, the end cover and the first tab will not be damaged due to heating, thereby reducing the probability that battery cells are damaged during the manufacturing process and improving the yield of battery cells.

The device for manufacturing a battery cell according to the present application includes: a first providing apparatus configured to provide a case having an accommodating cavity and an opening at one end; a second providing apparatus configured to provide an end cover and a solder, the solder being connected to one side of the end cover, and the melting point of the solder being lower than that of the end cover; a third providing apparatus configured to provide an electrode assembly having a first tab, the melting point of the first tab being higher than that of the solder; a fourth providing apparatus configured to provide an insulating member, an insulating cavity being provided on the insulating member, and a feed port being provided on one side of the insulating cavity; a first assembling apparatus configured to install the electrode assembly in the accommodating cavity, and causing the first tab to face the opening; a second assembling apparatus configured to dispose the insulating member between the end cover and the first tab, and connect the end cover to the case to close the opening, the solder being located between the end cover and the first tab, and the feed port facing the solder; and a heating apparatus configured to heat the solder to melt the solder so as to connect the end cover and the first tab.

The device for manufacturing a battery cell according to the present application reduces the probability that battery cells are damaged during the manufacturing process, increases the yield of battery cells, and improves the quality of battery cells.

Additional aspects and advantages of the present application will be set forth in part in the description which follows, and in part will be obvious from the description which follows, or may be learned by practice of the present application.

DESCRIPTION OF REFERENCE NUMERALS

Figure 1:
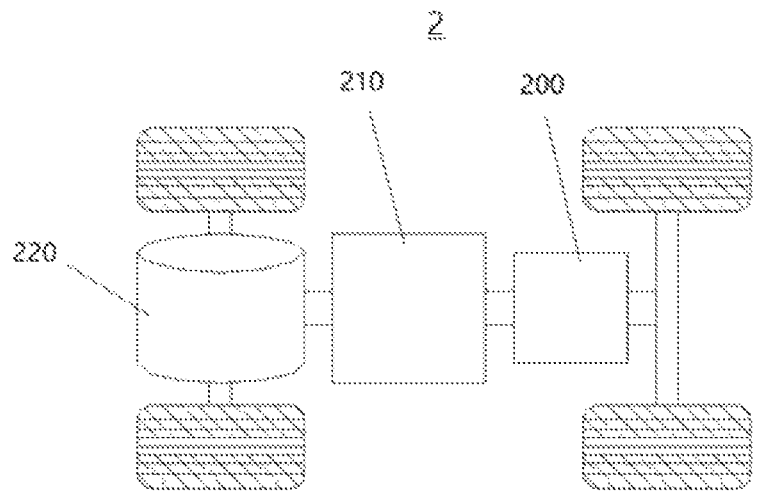
FIG. 1 is a schematic structural diagram of an electrical apparatus provided in an embodiment of the present application.

2. Car;
200. Battery;
210. Controller;
220. Motor;
300. Box;
100. Battery cell;
110. Case;
111. Accommodating cavity;
120. End cover;
130. Electrode assembly;
131. First tab;
132. Second tab;
140. Solder;
150. Insulating member;
151. Insulating cavity;
152. Feed port;
160. Thermal expansion member;
170. Insulating ring;
410. First providing apparatus;
420. Second providing apparatus;
430. Third providing apparatus;
440. Fourth providing apparatus;
450. First assembling apparatus;
460. Second assembling apparatus;
470. Heating apparatus.

DETAILED DESCRIPTION

For the objects, technical solutions and advantages of the embodiments of the present application to be clearer, the technical solutions in the embodiments of the present application will be clearly and completely described below in conjunction with the drawings in the embodiments of the present application, and it is apparent that the described embodiments are a part of the examples of the present application rather than all the embodiments. Based on the embodiments of the present application, all other embodiments derived by a person of ordinary skill in the art without any creative effort shall all fall within the protection scope of the present application.

Unless otherwise defined, all technical and scientific terms used herein have the same meaning as commonly understood by those skilled in the art belonging to the technical field of the present application; the terms used in the specification of the application here are intended only for the purpose of describing specific embodiments and are not intended to limit the present application.

The terms "including" and "having" and any variations thereof in the specification and the claims of the present application and in the description of drawings are intended to cover and not exclude other contents. The words "one" or "a/an" do not exclude the existence of a plurality.

Reference herein to "an embodiment" means that a particular feature, structure, or characteristic described in connection with the embodiment can be included in at least one embodiment of the present application. The appearance of this phrase "an embodiment" in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

Orientation words appearing in the following description are all directions shown in the drawings, and do not limit the specific structures of the battery cell, battery, electrical apparatus, or device for manufacturing a battery cell of the present application. For example, in the description of the present application, the orientation or positional relationships indicated by the terms "central", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on the orientation or positional relationships shown in the drawings and are only for facilitating the description of the present application and simplifying the description, rather than indicating or implying that the apparatus or element referred to must have a particular orientation or be constructed and operated in a particular orientation, and therefore will not be interpreted as limiting the present application.

In the description of the present application, it is to be noted that, unless otherwise expressly specified and defined, the terms "installation", "connecting", and "connection" shall be understood in a broad sense. For example, the "connecting" or "connection" of a mechanical structure may refer to a physical connection. For example, a physical connection may be a fixed connection, for example, a fixed connection by means of a fixing element, for example, a screw, bolt or other fixed element; a physical connection may also be a detachable connection, for example, mutual snap-fit or snap-fit connection; a physical connection may also be an integral connection, for example, a connection formed by welding, bonding or one-piece formation. The "connecting" or "connection" of a circuit structure not only can refer to a physical connection, but also can refer to an electrical connection or a signal connection. For example, it can be direct connection, that is, physical connection, or indirect connection through at least one intermediate component. It is enough to ensure that circuit communication is achieved, or it can also be internal connection between two components; in addition to signal connection through circuits, signal connection can also refer to signal connection through media, such as radio waves. For those of ordinary skill in the art, the specific meanings of the above terms in the present application can be understood according to specific situations.

The battery mentioned in the embodiments of the present application refers to a single physical module including one or more battery cells to provide a higher voltage and capacity. For example, the battery mentioned in the present application may include a battery module or a battery pack. For convenience of description, the battery module and battery pack may be collectively referred to as a battery herein. The battery generally includes a box for encapsulating one or more battery cells. The box can prevent liquid or other foreign matters from affecting charging or discharging of the battery cells.

In the present application, the battery cell may include a lithium-ion battery cell, a lithium-sulfur battery cell, a sodium-lithium-ion battery cell, a sodium-ion battery cell, a magnesium-ion battery cell, or the like, which is not limited in embodiments of the present application. The battery cell may be in a cylindrical shape, a flat shape, a cuboid shape or another shape, which is also not limited in the embodiments of the present application.

The battery cell includes a shell, an electrode assembly and an electrolyte solution.

For example, the electrode assembly consists of a positive electrode plate, a negative electrode plate, and a spacer. The battery cell operates mainly relying on movement of metal ions between the positive electrode plate and the negative electrode plate. The positive electrode plate includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive tab. Taking a lithium-ion battery as an example, the positive electrode current collector may be of a material of aluminum, and the positive electrode active material may be lithium cobalt oxide, lithium iron phosphate, ternary lithium or lithium manganate, etc. The negative electrode plate includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative tab. The negative electrode current collector may be of a material of copper, and the negative electrode active material may be carbon, silicon, etc. In order to ensure that no fusing occurs when a large current passes, there are a plurality of positive tabs which are stacked together, and there are a plurality of negative tabs which are stacked together. The material of the spacer may be polypropylene (PP), polyethylene (PE) or the like. In addition, the electrode assembly may have a wound structure or a laminated structure, and the embodiments of the present application are not limited thereto.

The shell includes a case and an end cover. The case is of a hollow cavity structure. The case has an opening. After the electrode assembly is installed into the case through the opening, the end cover is used to close the opening to seal the shell and prevent gaseous, liquid or solid substances from circulating between the inside and outside of the shell, which will affect the service performance of the battery cell.

The end cover generally needs to be electrically connected to the positive electrode tab or the negative electrode tab of the electrode assembly to deliver the current generated by the electrochemical reaction of the electrode assembly to the electrical apparatus.

In the prior art, after the end cover is installed onto the opening of the case, laser welding is generally used to weld the end cover and the tab on the corresponding side from the outside of the battery cell. However, after welding the end cover and tab in this way, the battery cell often suffers from quality problems such as liquid leakage and short-circuit of cathode and anode.

In the prior art, during the process of laser welding the end cover and the tab, due to the inevitable energy fluctuation of the laser, it is unavoidable to weld through the tab or shift the laser spot to a position where welding is not needed. For example, the laser damages the isolation film to directly connect the positive electrode plate and the negative electrode plate, causing a short circuit in the battery cell.

Alternatively, the laser damages the structure of the end cover or the case, resulting in a hole in the shell, thus causing liquid leakage.

In view of the above problems, embodiments of the present application provide a battery cell, a battery, an electrical apparatus, and a method and device for manufacturing a battery cell, which can reduce the damage to a battery cell during the welding process of the battery cell, and improve the yield of the battery cell.

The batteries in the embodiments of the present application are applicable to various devices using batteries, such as mobile phones, portable apparatuses, laptops, battery vehicles, electric toys, electric tools, electric vehicles, ships, spacecrafts, and the like. For example, the spacecrafts include airplanes, rockets, space shuttles, spaceships, etc., but are not limited to this.

As shown in FIG. 1, which is a schematic structural diagram of an electrical apparatus provided in an embodiment of the present application. Taking the electrical apparatus being a vehicle as an example, the vehicle may be a fuel vehicle, a gas vehicle or a new-energy vehicle. The new-energy vehicle may be an all-electric vehicle, a hybrid vehicle, an extended-range electric vehicle, etc. The vehicle 2 comprises a battery 200, a controller 210 and a motor 220. The battery 200 is configured to supply power to the controller 210 and the motor 220 as the operating power and driving power of the vehicle 2. For example, the battery 200 is used for meeting the working power requirements of the vehicle 2 during starting, navigating and running. For example, the battery 200 supplies power to the controller 210, the controller 210 controls the battery 200 to supply power to the motor 220, and the motor 220 receives and uses the power from the battery 200 as the driving power of the vehicle 2, replacing or partially replacing the driving power provided by the fuel or natural gas for the vehicle.

In order to meet different power requirements, the battery 200 may include a plurality of battery cells 100, wherein the plurality of battery cells 100 may be in series connection, parallel connection or parallel-series connection. The parallel-series connection refers to a combination of series connection and parallel connection. Optionally, the plurality of battery cells 100 may be in series, parallel or parallel-series connection to form battery modules first, and then the plurality of battery modules may be in series, parallel or parallel-series connection to form the battery 200. That is, a plurality of battery cells 100 may directly form a battery 200, or may first form battery modules, and then the battery modules form a battery 200.

Figure 2:
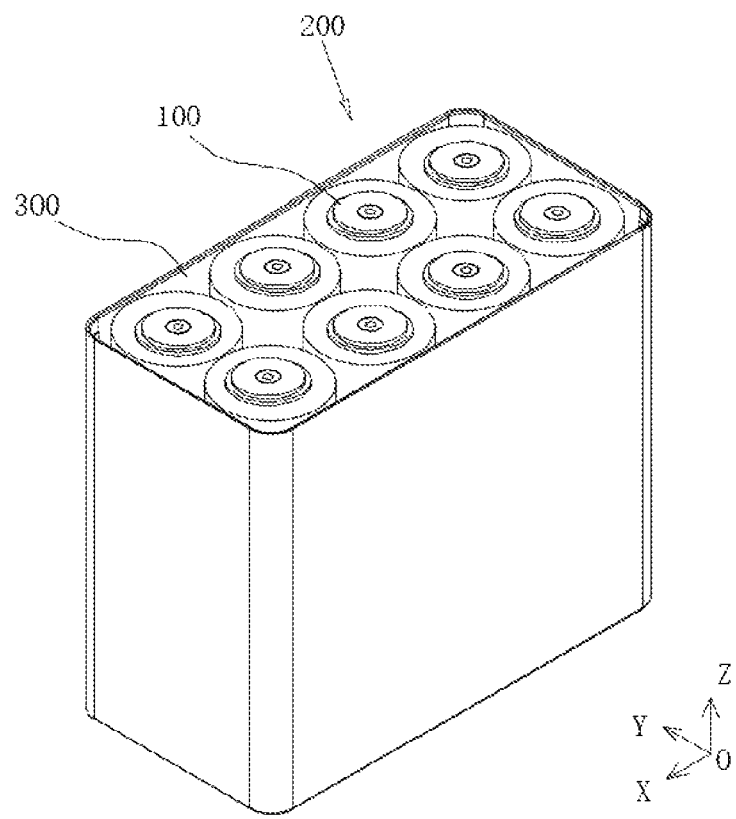
FIG. 2 is a schematic structural diagram of a battery provided in an embodiment of the present application.

For example, as shown in FIG. 2, which is a schematic structural diagram of a battery provided in an embodiment of the present application, the battery 200 may include more than two battery cells 100 and a box 300. The box has an opening at one or both ends, and the multiple battery cells 100 are put into the space in the box through the opening. It can be understood that the multiple battery cells are first grouped together and electrically connected in series, parallel or parallel-series connection to form battery modules. Then, the battery modules are connected in series, parallel or parallel-series to achieve a large current or voltage. Optionally, the box can be made of metal or plastic.

In addition, the box 300 for accommodating multiple battery cells 100 may not be limited to the above structure. For example, the box 300 includes two parts, both parts have openings, and the two parts are combined at the openings to form a cavity for accommodating the battery cells 100, which is not limited in the present application.

Figure 3:
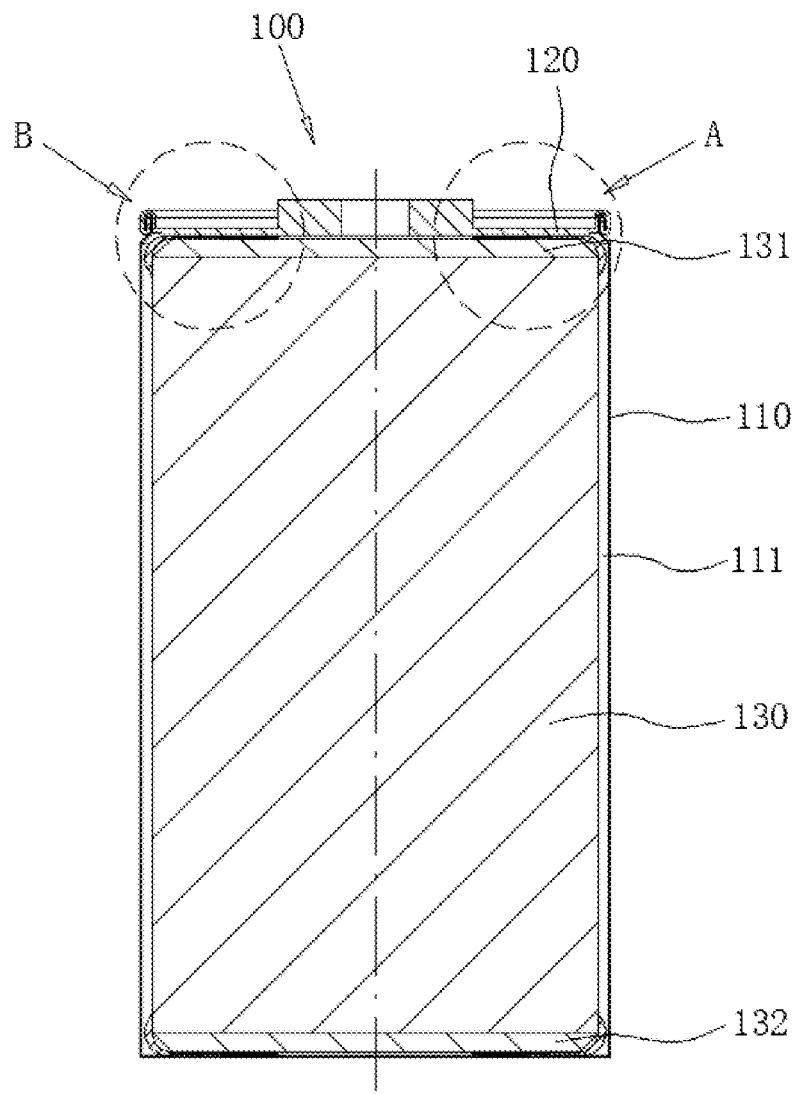
FIG. 3 is a schematic diagram of the cross-sectional structure of a battery cell provided in an embodiment of the present application.
Figure 4:
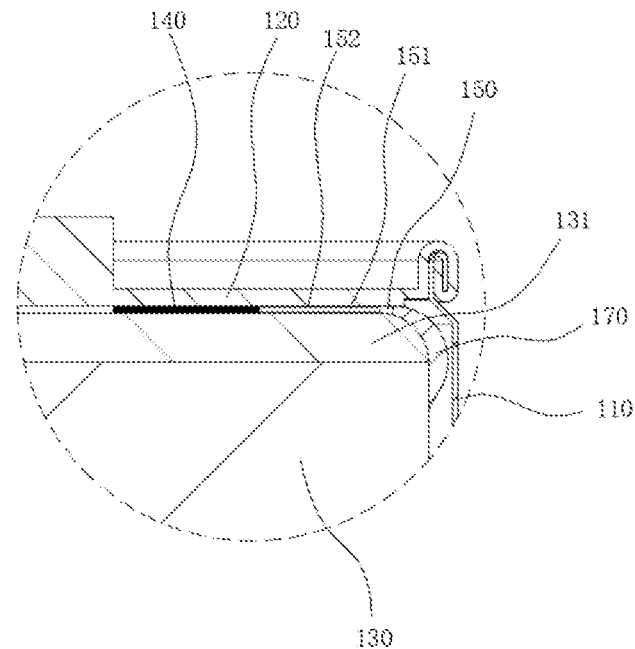
FIG. 4 is a schematic enlarged structural diagram of Part A in FIG. 3.

FIG. 3 is a schematic diagram of the cross-sectional structure of a battery cell provided in an embodiment of the present application. FIG. 4 is a schematic enlarged structural diagram of Part A in FIG. 3. As shown in FIGS. 3 and 4, the battery cell 100 includes a case 110, an end cover 120, an electrode assembly 130 and a solder 140, the case 110 has an accommodating cavity 111 and an opening at one end; the end cover 120 is connected to the case 110 for closing the opening; the electrode assembly 130 is located in the accommodating cavity 111, and the electrode assembly 130 has a first tab 131, and the first tab 131 faces the opening; the solder 140 is provided between the end cover 120 and the first tab 131 and connects the end cover 120 and the first tab 131, and the melting point of the solder 140 is lower than that of the end cover 120 and the first tab 131.

The case 110 and the end cover 120 are both made of metal, such as aluminum or aluminum alloy. The case 110 and the end cover 120 are sealed and connected by roll sealing, pier sealing, etc., and the insulation between the case 110 and the end cover 120 is ensured. For example, when using roll sealing, the case wall needs to be insulated.

It can be understood that roll sealing refers to a process of overlapping the edge of the end cover 120 with the opening edge of the case 110 and rolling them together to connect the end cover 120 and the case 110.

Pier sealing refers to a process in which the end cover 120 and the opening edge of the case 110 are squeezed by pressure and connected.

The insulation treatment method between the case 110 and the end cover 120 may be sandwiching an insulating film between the case 110 and the end cover 120, or providing an insulating coating on the surface of the case 110 or the end cover 120. This is not limited in the embodiments of the present application.

As shown in FIG. 3, in some embodiments, the electrode assembly 130 has two tabs, namely, a first tab 131 and a second tab 132. It can be understood that the first tab 131 may be a positive tab or a negative tab, and the second tab 132 is a tab with polarity opposite to the first tab 131. Both the first tab 131 and the second tab 132 can be formed through a flattening process. If the first tab 131 is electrically connected to the end cover 120, the second tab 132 is electrically connected to the case 110; if the first tab 131 is electrically connected to the case 110, then the second tab 132 is electrically connected to the end cover 120. The embodiment of the present application takes the electrical connection between the first tab 131 and the end cover 120 as an example.

In the embodiment of the present application, the end cover 120 and the first tab 131 are electrically connected through the solder 140, and the melting point of the solder 140 is lower than that of the end cover 120 and the first tab 131. On this basis, according to the melting points of the end cover 120 and the first tab 131, the material of the solder 140 can be soft solder 140 or hard solder 140, and the solder 140 can be a eutectic solder 140 or a non-eutectic solder 140.

The solder 140 is connected to the end cover 120 and the first tab 131 through a process of melting and re-solidification. When the melting point of the solder 140 is lower than that of the end cover 120 and the first tab 131, by controlling the heating temperature for the solder 140 to be higher than the melting point of the solder 140 and lower than that of the end cover 120 and the first tab 131 in the welding process, the solder 140 is melted while the end cover 120 and the first tab 131 are not melted, and the molten solder 140 contacts with the end cover 120 and the first tab 131 and is connected with the end cover 120 and the first tab 131 respectively during solidification.

The above-mentioned structure of the present application ensures that the solder 140 is connected to the end cover 120 and the first tab 131 while avoiding damage to the end cover 120 and the first tab 131 during the welding process, reducing the risk of liquid leakage in the battery cell 100 and short-circuit of the cathode and anode, thereby improving the quality of the battery cell 100 and increasing the yield of the battery cell 100.

In some embodiments, the solder 140 is a eutectic solder.

There is no solid-liquid coexistence phase in the eutectic solder during the heating process. That is, when the temperature is lower than its melting point, the solder 140 is in a solid state. When the temperature is higher than its melting point, the solder 140 is in a liquid state, and the solder 140 will not be softened as the temperature increases. Non-eutectic solder, on the other hand, can be softened gradually as the temperature increases until it melts.

It can be seen that as the temperature gradually increases, the strength of the non-eutectic solder will decrease, making the connection stability between the end cover 120 and the first tab 131 worse, while the eutectic solder will always remain in a hard solid state until the temperature reaches the melting point, which will make the connection between the end cover 120 and the first tab 131 relatively stable, thus better improving the structural stability of the battery cell 100.

In some embodiments, the solder 140 is evenly disposed around the axis of the end cover 120.

Figure 5:
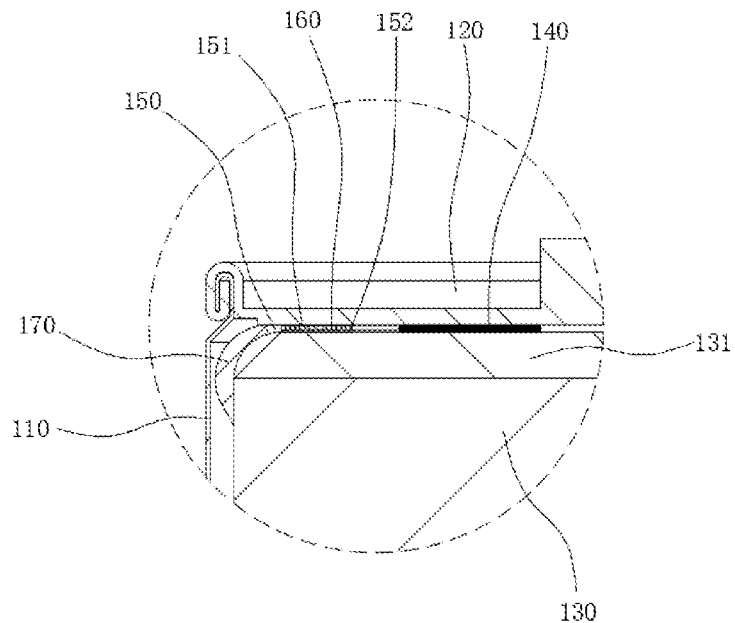
FIG. 5 is a schematic enlarged structural diagram of Part B in FIG. 3.

FIG. 5 is a schematic enlarged structural diagram of part B in FIG. 3. Combining FIG. 3, FIG. 4 and FIG. 5, the solder 140 can be configured in an annular shape, and the axis of the annular shape substantially coincides with the axis of the end cover 120. The solder 140 may also be disposed at multiple locations, and the multiple locations are evenly distributed around the axis of the end cover 120.

There are two main advantages of this arrangement. First, the circumference of the end cover 120 along its own axis is connected to the first tab 131 through the solder 140, so the connection structure is stable, and when the external part of the end cover 120 is stressed, the phenomena such as loosening and cracking are not easy to occur between the end cover 120 and the first tab 131; secondly, in the soldering and brazing process, when the solder 140 is heated from the outside of the end cover 120, although the specific position of the solder 140 cannot be seen by personnel, the solder 140 can be heated and melted by heating uniformly around the axis of the end cover 120, so as to prevent the phenomenon that the heating position does not correspond to the position of the solder 140, which leads to the solder 140 not melting.

As shown in FIGS. 4 and 5, in some embodiments, an insulating member 150 is further provided between the end cover 120 and the first tab 131. An insulating cavity 151 is provided on the insulating member 150, a feed port 152 is provided on one side of the insulating cavity 151, and the feed port 152 faces the solder 140; and when the temperature of the battery cell 100 reaches the melting point of the solder 140, at least part of the solder 140 is melted and enters the insulating cavity 151 to reduce the current between end cover 120 and the first tab 131 or form an open circuit between the end cover 120 and the first tab 131.

The insulating member 150 can be ceramic, mica, polytetrafluoroethylene, etc. The melting point of the insulating member 150 is higher than the melting point of the solder 140 to ensure that the insulating member 150 is stably supported between the first tab 131 and the end cover 120 after the solder 140 is melted, and the insulating member 150 will not be melted and softened to cause the feed port 152 to deform or close.

During use of the battery cell 100, the first tab 131 and the end cover 120 are electrically connected by the solder 140. When the battery cell 100 generates heat due to abnormal use, as the temperature rises, the electrochemical reaction in the battery cell 100 intensifies, and the electrode assembly 130 will rapidly discharge gases and chemicals, causing the temperature and pressure of the battery cell 100 to rise sharply. If this situation is not controlled, the battery cell 100 is likely to undergo thermal runaway after the temperature or pressure reaches a corresponding level, making the battery cell 100 no longer usable and the electrical apparatus unable to operate normally.

After the insulating member 150 is provided between the end cover 120 and the first tab 131, when the temperature inside the battery cell 100 rises above the melting point of the solder 140, the solder 140 is melted. In addition, when the electrical apparatus is in use, the battery cell 100 will inevitably vibrate or shake along with the apparatus itself, causing at least part of the molten solder 140 to flow into the insulating cavity 151 from the feed port 152. At this time, two situations will occur. The first is that part of the solder 140 flows into the insulating cavity 151 from the feed port 152. At this time, the first tab 131 and the end cover 120 are electrically connected through a small part of the solder 140. The current flowing through the battery cell 100 decreases, so the electrochemical reaction of the battery cell 100 is weakened, and heat generation is reduced. The second situation is that almost all the solder 140 enters the insulating cavity 151, and there is no solder 140 to electrically connect the first tab 131 and the end cover 120, resulting in forming an open circuit between the first tab 131 and the end cover 120. The electrochemical reaction of the battery cell 100 stops, and heat generation stops. The both situations can effectively slow down the temperature rise of the battery cell 100 or reduce the temperature inside the battery cell 100.

It can be seen that the combined use of the insulating member 150 and the solder 140 can prevent the temperature and pressure of the battery cell 100 from continuously increasing and causing thermal runaway, thereby improving the use safety of the battery cell 100 and extending its service life.

It should be noted that although the solder 140 needs to be heated from the outside of the battery cell 100 in the process of connecting the solder 140 to the end cover 120 and the first tab 131, this process will also cause the solder 140 to melt. However, in this heating process, only the areas that need to be soldered and brazed are locally heated rather than heating the entire battery cell 100, so the area affected by the heating is small. Without affecting the properties of other components of the battery cell 100, only the solder 140 in the heated area may melt when the temperature reaches above the melting point to connect the end cover 120 and the first tab 131 together, that is, the soldering and brazing process in the process of manufacturing the battery cell 100 will not cause the battery cell 100 to undergo thermal runaway.

In addition, during the soldering and brazing process, the battery cell 100 has not yet been assembled into the electrical apparatus, so the probability that the battery cell 100 is vibrated or shaken is small. Although the solder 140 is melted and has fluidity, due to the surface tension of the liquid, the solder 140 will not automatically flow into the cavity 151 in the absence of external force (such as vibration and shaking of the battery cell 100), that is, the soldering and brazing process in the process of manufacturing the battery cell 100 will not cause the solder 140 to flow into the insulating cavity 151 and affect the normal use of the battery cell 100.

Figure 6:
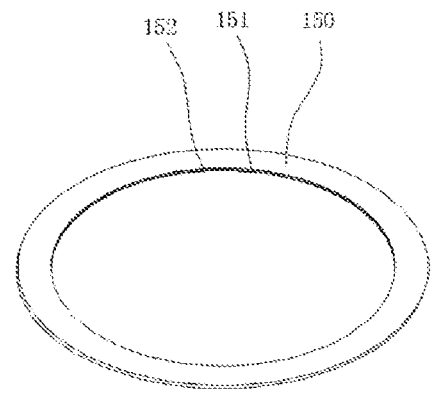
FIG. 6 is a schematic structural diagram of an insulating member in an embodiment of the present application.

FIG. 6 is a schematic structural diagram of an insulating member in an embodiment of the present application. With reference to FIGS. 4, 5 and 6, in some embodiments, the insulating member 150 is annularly arranged around the periphery of the solder 140, and the insulating cavity 151 is opened along the circumference of the insulating member 150, and the feed port 152 is located on the side of the insulating cavity 151 close to the inner hole of the insulating member 150.

It can be understood that the annular shape may be a circular ring, a square ring, a triangular ring or a special-shaped ring, etc. The shape of the annular shape is determined according to the projection shape of the insulating member 150 along the axis of the end cover 120 on the surface of the end cover 120. The inner boundary of the insulating member 150 is the inner hole, the outer boundary is the outer ring, the solder 140 is located within the inner hole of the insulating member 150, and the feed port 152 is located around the inner hole of the insulating member 150.

By adopting the above solution, when the solder 140 is melted, no matter in which direction the solder 140 flows, it can flow into the insulating cavity 151 from the feed port 152, so that the solder 140 can flow into the insulating cavity 151 in time, and the control ability of over thermal runaway can be better improved.

As shown in FIG. 5, in some embodiments, a thermal expansion member 160 is further disposed between the end cover 120 and the first tab 131. When the temperature inside the battery cell 100 reaches the melting point of the solder 140, the volume of the thermal expansion member 160 increases, and at least part of the solder 140 is squeezed into the insulating cavity 151.

The thermal expansion member 160 is composed of an insulating thermal expansion material, such as epoxy resin, thermoplastic polymer, or heat-activated foaming agent. The expansion temperature of the thermal expansion member 160 may be less than, greater than, or equal to the melting point of the solder 140. It is worth noting that the melting points of the thermal expansion member 160 and the solder 140 are both smaller than the thermal runaway temperature of the battery cell 100, and the thermal runaway temperature of the battery cell 100 is related to factors such as the materials and volumes of the components of the battery cell 100. For example, when the thermal expansion temperature of the battery cell 100 is 100° ° C., the expansion temperature of the thermal expansion member 160 and the melting point of the solder 140 are both lower than 100° C., so as to ensure that the thermal expansion member 160 can expand and squeeze the molten solder 140 into the insulating cavity 151 before the temperature inside the battery cell 100 reaches the high temperature of thermal runaway.

Optionally, at least part of the thermal expansion member 160 and the feed port 152 are located on opposite sides of the solder 140 so that the solder 140 can be directly squeezed into the insulating cavity 151 from the feed port 152 after the thermal expansion member 160 expands.

By adopting the above solution, the expansion of the thermal expansion member 160 is used to squeeze the solder 140 into the insulating cavity 151, so that the molten solder 140 can flow into the insulating cavity 151 in time under the action of fluid tension, and the solder 140 can control the temperature reduction of the battery cell 100 in time.

Figure 7:
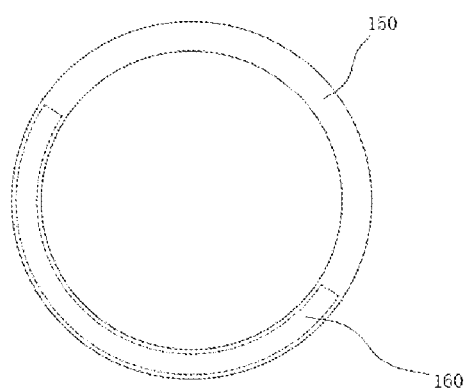
FIG. 7 is a perspective view of the insulating member.

FIG. 7 is a perspective view of the insulating member 150. In some embodiments, at least part of the thermal expansion member 160 is disposed in the insulating cavity 151.

For example, when the insulating member 150 is annularly arranged around the periphery of the solder 140, the insulating cavity 151 is opened along the circumference of the insulating member 150, and the feed port 152 is located on the side of the insulating cavity 151 close to the inner hole of the insulating member 150, since the solder 140 faces the feed port 152 in all directions, the molten solder 140 can be directly squeezed into the insulating cavity 151 from the feed port 152 regardless of whether the thermal expansion member 160 is arranged on either side of the solder 140.

It should be noted that when the thermal expansion member 160 is partially or entirely disposed in the insulating cavity 151, the thermal expansion member 160 occupies part of the space of the insulating cavity 151, but cannot completely occupy the space of the insulating cavity 151, thus leaving the space of the insulating cavity 151 on the side opposite to the thermal expansion member 160 for containing the molten solder 140.

Through the above structure, the thermal expansion member 160, the insulating member 150 and the solder 140 are all located between the end cover 120 and the first tab 131. At least part of the thermal expansion member 160 is disposed in the insulating cavity 151, so there is a larger space between the end cover 120 and the first tab 131 for disposing the solder 140, so that the solder 140 can connect the end cover 120 and the first tab 131 relatively stably. Therefore, the above structural arrangement is reasonable and is conducive to improving electrical connection stability of the battery cell 100.

As shown in FIGS. 4 and 5, in some embodiments, the battery cell 100 further includes an insulating ring 170, and the insulating ring 170 is around the first tab 131 to isolate the first tab 131 from the case 110.

The insulating ring 170 may be an annular member made of ceramic, mica, polytetrafluoroethylene or other materials. It should be noted that the insulating ring 170 is not limited to a cylindrical ring. Taking the plane where the axis of the insulating ring 170 is located as the cross section, the one-side shape of the insulating ring 170 can be any shape. It can be understood that the diameter of at least one end of the insulating ring 170 is larger than the diameter of the first tab 131.

By arranging the insulating ring 170 around the first tab 131, it is possible to prevent the first tab 131 from contacting the case 110 and causing a short circuit with the case 110 during the manufacturing and use processes, and prevent the electrochemical corrosion of the case 110 from being aggravated due to the formation of a passage between the first tab 131 and the case 110 of the battery 200 during use of the battery 200, thus ensuring the normal use of the battery cell 100 and prolonging the life of the battery cell 100.

Figure 8:
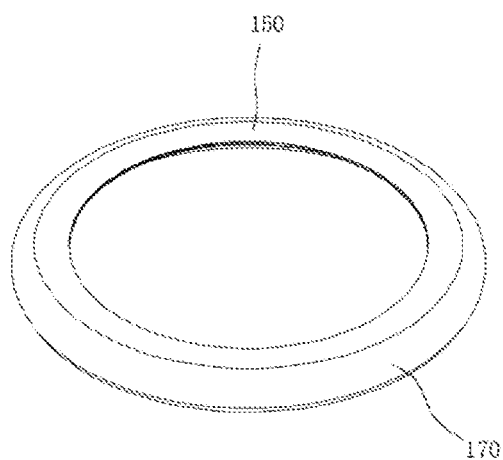
FIG. 8 is a schematic structural diagram of a combination of an insulating ring and an insulating member provided in an embodiment of the present application.

FIG. 8 is a schematic structural diagram of the combination of an insulating ring and an insulating member in an embodiment of the present application. With reference to FIGS. 4, 5 and 8, in some embodiments, the insulating ring 170 is connected to the insulating member 150.

It can be understood that the insulating ring 170 and the insulating member 150 may be integrally formed, or may be connected later through a connecting medium.

By adopting the above solution, in one direction of the battery cell 100, the insulating member 150 is limited by the end cover 120 and the first tab, and in the other direction of the battery cell 100, the insulating ring 170 is limited by the first tab 131 and the case 110, and the insulating ring 170 and the insulating member 150 are connected so that the whole composed of the two can be limited in both directions of the battery cell 100, thereby making the internal structure of the battery cell 100 more stable, so as to make the insulating member 150 and the insulating ring 170 function more reliably. In addition, during the manufacturing process of the battery cell 100, the insulating ring 170 and the insulating member 150 can be assembled to the battery cell 100 at one time, thereby improving the manufacturing efficiency of the battery cell 100.

An embodiment of the present application further provides a battery, including the battery cell 100 of any embodiment of the above-mentioned subject matter.

By adopting the above solution, since the solder 140 with a small melting point is used to connect the end cover 120 and the first tab 131, the probability of damage to the end cover 120 and the first tab 131 in the manufacturing process of the battery cell 100 is small, the yield of the battery cell 100 is high, the quality of the battery 200 is improved, and the service life of the battery 200 is prolonged.

An embodiment of the present application further provides an electrical apparatus, including the battery 200 of any embodiment of the above-mentioned subject matter, the battery 200 being used to provide electrical energy for the electrical apparatus.

By adopting the above solution, since the battery 200 is of good quality and has a long service life, the operation of the electrical apparatus is more stable, has higher reliability, and has a longer service life.

Figure 9:
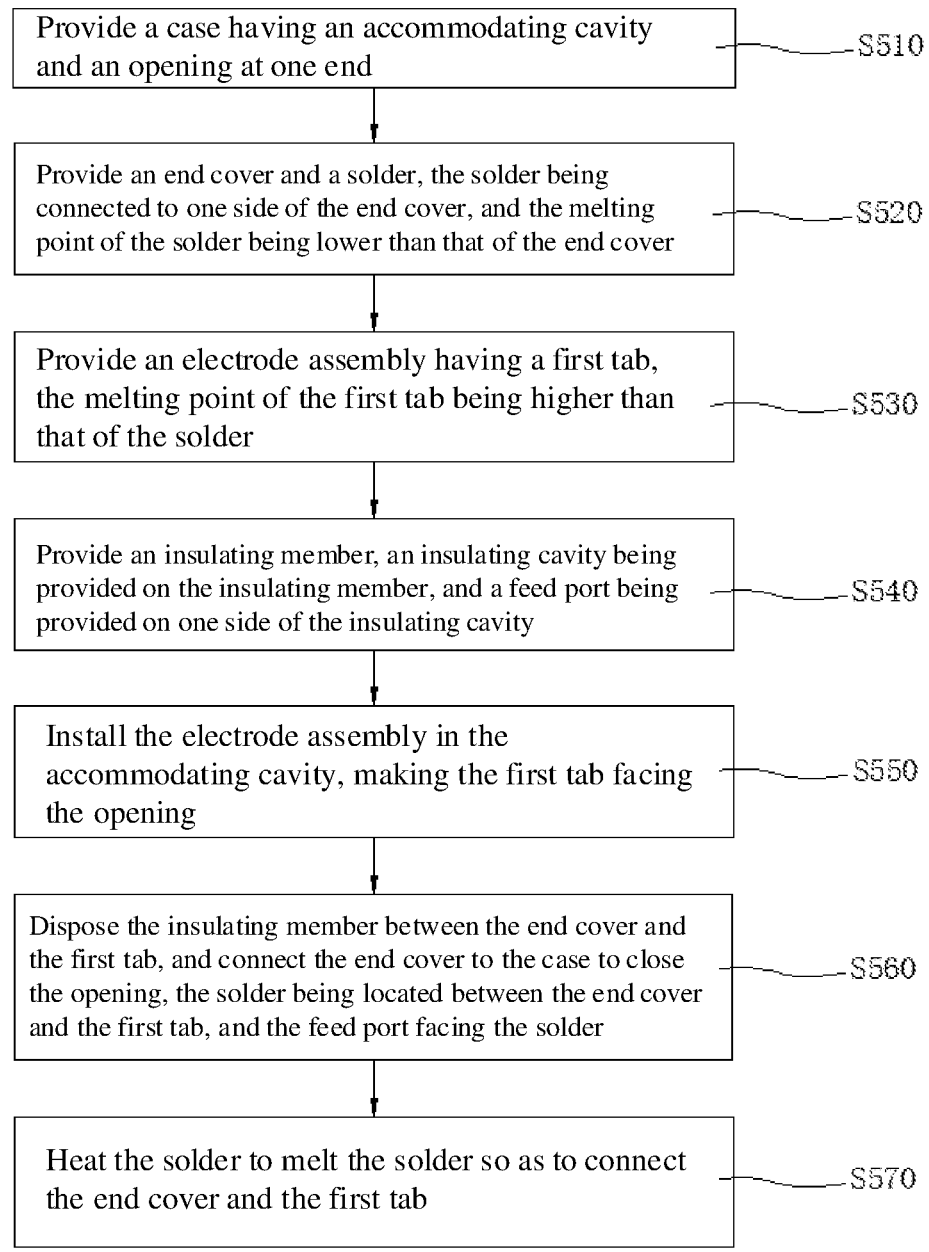
FIG. 9 is a flow chart of a method for manufacturing a battery cell provided in an embodiment of the present application.

FIG. 9 is a flowchart of a method for manufacturing a battery cell provided in an embodiment of the present application. As shown in FIG. 9, the embodiment of the present application also provides a method for manufacturing a battery cell, which comprises the following steps:

S510: Provide a case 110 having an accommodating cavity 111 and an opening at one end.

S520: Provide an end cover 120 and a solder 140, the solder 140 being connected to one side of the end cover 120, and the melting point of the solder 140 being lower than that of the end cover 120.

S530: Provide an electrode assembly 130 having a first tab 131, the melting point of the first tab 131 being higher than that of the solder 140.

S540: Provide an insulating member 150, an insulating cavity 151 being provided on the insulating member 150, and a feed port 152 being provided on one side of the insulating cavity 151.

S550: Install the electrode assembly 130 in the accommodating cavity 111, making the first tab 131 facing the opening.

S560: Dispose the insulating member 150 between the end cover 120 and the first tab 131, and connect the end cover 120 to the case 110 to close the opening, the solder 140 being located between the end cover 120 and the first tab 131, and the feed port 152 facing the solder 140.

S570: Heat the solder 140 to melt the solder 140 so as to connect the end cover 120 and the first tab 131.

According to an embodiment of the present application, in step S520, the end cover 120 and the solder 140 can be connected together before entering the factory, thereby reducing steps in the manufacturing process of the battery 200 and improving the manufacturing efficiency of the battery 200; the end cover 120 and the solder 140 can also be sent to the factory separately, and then connected in the manufacturing process of the battery 200. For example, the solder 140 is melted by heating and adhered to the end cover 120.

It should be noted that in the above-mentioned manufacturing method of the battery cell 100, the order of the steps is not completely in accordance with the above-mentioned arrangement order. During the actual manufacturing process of the battery cell 100, the order of the above-mentioned steps can be adjusted according to the actual situation, or synchronized, or other steps are added to manufacture other components of the battery cell 100 to finally obtain the required battery cell 100. Reference can be made to the embodiments of the part of the battery cell 100.

The specific details of each component of the battery cell 100 provided according to the method in the embodiment of the present application and the specific structure and function of the manufactured battery cell 100 have been described in detail in the corresponding embodiment of the battery cell 100, so they are not repeated here.

In addition, any method that can manufacture the relevant components and connect the relevant components falls within the protection scope of the embodiments of the present application, and will not be described again in the embodiments of the present application.

By adopting the above solution, the melting point of the solder 140 is lower than the melting point of the end cover 120 and the melting point of the first tab 131. Therefore, when the solder 140 is heated, the solder 140 can be melted and connect the end cover 120 and the first tab 131 together. At the same time, the end cover 120 and the first tab 131 will not be damaged due to heating, thereby reducing the probability that the battery cell 100 is damaged during the manufacturing process and improving the yield of the battery cell 100.

Figure 10:
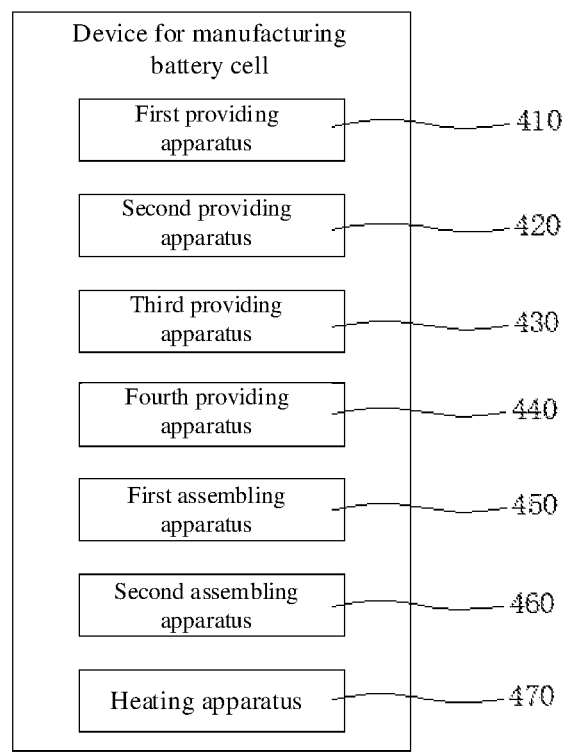
FIG. 10 is a schematic structural diagram of a device for manufacturing a battery cell provided in an embodiment of the present application.

Finally, as shown in FIG. 10, an embodiment of the present application also provides a device for manufacturing a battery cell, which comprises the following apparatuses:

a first providing apparatus 410 configured to provide a case 110, the case 110 having an accommodating cavity 111 and an opening at one end;

a second providing apparatus 420 configured to provide an end cover 120 and a solder 140, the solder 140 being connected to one side of the end cover 120, and the melting point of the solder 140 being lower than that of the end cover 120;

a third providing apparatus 430 configured to provide an electrode assembly 130, the electrode assembly 130 having a first tab 131, and the melting point of the first tab 131 being higher than that of the solder 140;

a fourth providing apparatus 440 configured to provide an insulating member 150, an insulating cavity 151 being provided on the insulating member 150, and a feed port 152 being provided on one side of the insulating cavity 151;

a first assembling apparatus 450 configured to install the electrode assembly 130 in the accommodating cavity 111 and cause the first tab 131 to face the opening;

a second assembling apparatus 460 configured to dispose the insulating member 150 between the end cover 120 and the first tab 131, and connect the end cover 120 to the case 110 to close the opening, wherein the solder 140 is located between the end cover 120 and the first tab 131, and the feed port 152 faces the solder 140; and a heating apparatus 470 configured to heat the solder 140 to melt the solder 140 so as to connect the end cover 120 and the first tab 131.

The specific functions of the above-mentioned apparatuses for manufacturing the battery cell 100 and the details of parts of the manufactured battery cell 100 have been described in detail in the corresponding embodiments of the battery cell 100, so they will not be described again here.

The above device is less likely to cause damage to the battery cell 100 in the process of manufacturing the battery cell 100, and can improve the yield of the battery cell 100, thus improving the quality of the battery cell 100.

To sum up, in the embodiment of the present application, the solder 140 is disposed between the end cover 120 and the first tab 131 and the melting point of the solder 140 is lower than that of the end cover 120 and the first tab 131, thereby making it possible to melt the solder 140 while not melt the end cover 120 and the first tab 131 by controlling the heating temperature for the solder 140 during the welding process to be greater than the melting point of the solder 140 and lower than the melting points of the end cover 120 and the first tab 131. While ensuring that the solder 140 connects the end cover 120 and the first tab 131 together, the damage to the end cover 120 and the first tab 131 in the welding process is avoided, and the quality of the battery cell 100 and the yield of the battery cell 100 are improved.

In the description, the explanation with reference to the terms such as "an embodiment", "some embodiments", "exemplary embodiments", "examples", "specific examples", or "some examples" means that specific features, structures, materials, or characteristics described in combination with the embodiment(s) or example(s) are included in at least one embodiment or example of the present application. In the description, the illustrative expressions of the above-mentioned terms do not necessarily refer to the same embodiment or example. Moreover, the specific features, structures, materials, or characteristics described herein may be combined in any one or more embodiments or examples in a suitable manner.

Although the embodiments of the present application have been shown and described, those of ordinary skill in the art will understand that various changes, modifications, substitutions and modifications can be made to these embodiments without departing from the principles and purposes of the present application. The scope of the present application is defined by the claims and their equivalents.

What is claimed is:

1. A battery cell, comprising:
   a case having an accommodating cavity and an opening at one end;
   an end cover connected to the case and used to close the opening;
   an electrode assembly disposed in the accommodating cavity, the electrode assembly having a first tab facing the opening;
   a solder disposed between the end cover and the first tab and connecting the end cover and the first tab, the melting point of the solder being lower than that of the end cover and the first tab; and
   an insulating member disposed between the end cover and the first tab,
   wherein an insulating cavity is provided on the insulating member, a feed port is provided on one side of the insulating cavity, the feed port faces the solder, and when the temperature of the battery cell reaches the melting point of the solder, at least part of the solder is melted and enters the insulating cavity to reduce the current between the end cover and the first tab or form an open circuit between the end cover and the first tab.

2. The battery cell according to claim 1, wherein the solder is a eutectic solder.

3. The battery cell according to claim 1, wherein the solder is uniformly arranged around the axis of the end cover.

4. The battery cell according to claim 1, wherein the insulating member is annularly arranged around the periphery of the solder, the insulating cavity is opened along the circumference of the insulating member, and the feed port is provided on the side of the insulating cavity close to the inner hole of the insulating member.

5. The battery cell according to claim 4, wherein a thermal expansion member is further provided between the end cover and the first tab, and when the temperature inside the battery cell reaches the melting point of the solder, the volume of the thermal expansion member increases to squeeze at least part of the solder into the insulating cavity.

6. The battery cell according to claim 5, wherein at least part of the thermal expansion member is arranged in the insulating cavity.

7. The battery cell according to claim 1, wherein the battery cell further comprises an insulating ring arranged around the outside of the first tab to isolate the first tab from the case.

8. The battery cell according to claim 7, wherein the insulating ring is connected to the insulating member.

9. A battery, comprising the battery cell according to claim 1.

10. An electrical apparatus, comprising the battery according to claim 9, wherein the battery provides electric energy for the electrical apparatus.

11. A method for manufacturing a battery cell, comprising:
    providing a case having an accommodating cavity and an opening at one end;
    providing an end cover and a solder, the solder being connected to one side of the end cover, and the melting point of the solder being lower than that of the end cover;
    providing an electrode assembly having a first tab, the melting point of the first tab being higher than that of the solder;
    providing an insulating member, an insulating cavity being provided on the insulating member, and a feed port being provided on one side of the insulating cavity;
    installing the electrode assembly in the accommodating cavity, and causing the first tab to face the opening;
    disposing the insulating member between the end cover and the first tab, and connecting the end cover to the case to close the opening, wherein the solder is located between the end cover and the first tab, and the feed port faces the solder; and
    heating the solder to melt the solder so as to connect the end cover and the first tab.

12. A device for manufacturing a battery cell, comprising:
    a first providing apparatus configured to provide a case having an accommodating cavity and an opening at one end;
    a second providing apparatus configured to provide an end cover and a solder, the solder being connected to one side of the end cover, and the melting point of the solder being lower than that of the end cover;
    a third providing apparatus configured to provide an electrode assembly having a first tab, the melting point of the first tab being higher than that of the solder;
    a fourth providing apparatus configured to provide an insulating member, an insulating cavity being provided on the insulating member, and a feed port being provided on one side of the insulating cavity;
a first assembling apparatus configured to install the electrode assembly in the accommodating cavity and cause the first tab to face the opening;
a second assembling apparatus configured to dispose the insulating member between the end cover and the first tab, and connect the end cover to the case to close the opening, wherein the solder is located between the end cover and the first tab, and the feed port faces the solder; and
a heating apparatus configured to heat the solder to melt the solder so as to connect the end cover and the first tab.

* * * * *